US010053069B2

(12) United States Patent
Wei et al.

(10) Patent No.: US 10,053,069 B2
(45) Date of Patent: Aug. 21, 2018

(54) GRADED BRAKING CONTROL DEVICE AND CONTROL METHOD FOR VEHICLE TIRE BURST

(71) Applicants: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

(72) Inventors: Shuncheng Wei, Hangzhou (CN); Xiaozhen Zhu, Hangzhou (CN); Yujian Chen, Hangzhou (CN); Jiansheng Zhu, Hangzhou (CN); Bo Li, Hangzhou (CN); Xiang Meng, Hangzhou (CN); Wei Liu, Hangzhou (CN); Zhijie Pan, Hangzhou (CN); Chengming Wu, Hangzhou (CN); Qingfeng Feng, Hangzhou (CN)

(73) Assignees: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 330 days.

(21) Appl. No.: 15/301,273
(22) PCT Filed: Sep. 25, 2014
(86) PCT No.: PCT/CN2014/087457
§ 371 (c)(1),
(2) Date: Sep. 30, 2016
(87) PCT Pub. No.: WO2015/074460
PCT Pub. Date: May 28, 2015

(65) Prior Publication Data
US 2017/0066421 A1 Mar. 9, 2017

(30) Foreign Application Priority Data
Nov. 19, 2013 (CN) .......................... 2013 1 0587345

(51) Int. Cl.
*B60T 8/172* (2006.01)
*B60C 23/04* (2006.01)
(Continued)

(52) U.S. Cl.
CPC ........ *B60T 8/1725* (2013.01); *B60C 23/0408* (2013.01); *B60T 7/22* (2013.01);
(Continued)

(58) Field of Classification Search
CPC .... B60T 8/1725; B60T 5/17558; B60T 7/174; B60T 7/22; B60T 2240/03; B60T 2201/02; B60T 2270/30; B60C 23/0408
See application file for complete search history.

(56) References Cited

U.S. PATENT DOCUMENTS 6,498,967 B1 * 12/2002 Hopkins ............. B60C 23/0408
340/442

FOREIGN PATENT DOCUMENTS

CN 201552987 U 8/2010
CN 201587402 U 9/2010
(Continued)

OTHER PUBLICATIONS

International Search Report of the International Searching Authority and Written Opinion for Application No. PCT/CN2014/087457, dated Dec. 23, 2014.

*Primary Examiner* — Anne M Antonucci
(74) *Attorney, Agent, or Firm* — Alston & Bird LLP (57) ABSTRACT

The present invention provides a graded braking control device and control method for vehicle tire burst, and belongs to the technical field of vehicles. It solves the problems of rear-end collision and more instability of the vehicle resulting from emergency brake after vehicle tire burst. The device includes a tire pressure sensor, a controller, a radar sensor, a stability detection module and an ESC, wherein the radar sensor and the stability detection module are respectively connected with input ends of the controller, the tire
(Continued)

pressure sensor is in wireless connection with the controller, and the ESC is connected with an output end of the controller. The control method includes: 1. monitoring vehicle tire condition; 2. carrying out traffic state assessment and determining a first maximum braking deceleration value for preventing the rear-end collision with the follower vehicle after emergency brake of the present vehicle; 3. carrying out tire burst vehicle stability state assessment in combination with the current speed and setting the maximum braking deceleration under stable state; and 4. carrying out tire burst graded braking. The device and the method can ensure quick and stable braking of the tire burst vehicle, and avoid the rear-end collision of the present vehicle with the follower vehicle.

10 Claims, 2 Drawing Sheets

(51) Int. Cl.
*B60T 7/22* (2006.01)
*B60T 8/174* (2006.01)
*B60T 8/1755* (2006.01)

(52) U.S. Cl.
CPC .......... *B60T 8/174* (2013.01); *B60T 8/17558* (2013.01); *B60T 2201/02* (2013.01); *B60T 2240/03* (2013.01); *B60T 2270/30* (2013.01)

(56) References Cited

FOREIGN PATENT DOCUMENTS

| | | |
|---|---|---|
| CN | 102050096 | 5/2011 |
| CN | 102390227 A | 3/2012 |
| CN | 103253249 A | 8/2013 |
| CN | 203126819 U | 8/2013 |
| CN | 103587516 A | 2/2014 |
| DE | 10357254 A1 | 6/2005 |
| JP | 2008195147 A | 8/2008 |
| JP | 2010006217 A | 1/2010 |
| WO | WO 2010/017674 A1 | 2/2010 |

\* cited by examiner

GRADED BRAKING CONTROL DEVICE AND CONTROL METHOD FOR VEHICLE TIRE BURST

FIELD OF THE INVENTION

The present invention relates to the technical field of vehicles, and in particular, to a graded braking control device and control method for vehicle tire burst.

BACKGROUND OF THE INVENTION

As more and more vehicles run on the roads, traffic accidents are increasing year by year. There are many reasons for the traffic accidents, wherein the consequences of the traffic accidents caused by tire burst are very serious and generate serious threats to the life safety and property safety of people, data shows that the number of deaths caused by tire burst accounts for about half of the highway accident deaths in high speed travelling of vehicles, therefore tire burst is recognized as the number one killer of traffic safety in a high speed travelling state.

After vehicle tire burst, a rolling radius, vertical stiffness, longitudinal stiffness, lateral stiffness and other properties of the tire change greatly, resulting in changes of a vertical load, a rolling resistance torque, a lateral force and the like on the burst tire, which is embodied as adding an additional torque on the vehicle with respect to vehicle movement, such that the tire burst vehicle generates yawing motion, which reduces the stability of the tire burst vehicle, and as a result, the vehicle is collided and damaged. How to effectively protect the safety of occupants and the vehicle after the vehicle tire burst is a subject that people have been studied all the time.

The Chinese patent document with an application No. 201010605908.7 discloses a tire burst braking control system, including a control device and a tire pressure detection unit used for detecting a tire burst condition, wherein the control device is connected with an engine control unit and a tire pressure monitoring unit, the control device can control tire brake when receiving a tire burst signal fed back by the tire pressure monitoring unit and reduce the torque of the engine through the engine control unit. In the patent, emergency brake can be carried out and the torque of the engine can be reduced when the vehicle tire burst is sensed, but the emergency brake is carried out without considering the stability state of the vehicle in the patent, thereby being liable to make the vehicle more instable in the high speed travelling state, and generating serious potential safety hazards, moreover, the patent does not consider rear-end collision resulting from untimely response of vehicles behind due to the emergency brake of the present vehicle, which will lead to secondary damage after the tire burst, and thus there are certain potential safety hazards in the patent.

SUMMARY OF THE INVENTION

In view of the above problems in the prior art, the present invention provides a graded braking control device for vehicle tire burst. The device can ensure quick and stable braking of a tire burst vehicle, and avoid rear-end collision between a follower vehicle and the tire burst vehicle.

The present invention is achieved by the following technical solutions: a graded braking control device for vehicle tire burst includes a tire pressure sensor used for detecting a tire pressure state of a tire, wherein the device further includes a controller, a radar sensor used for detecting a travelling state of a follower vehicle relative to the present vehicle, a stability detection module used for detecting a stability state of the present vehicle and an ESC used for achieving stable braking of the vehicle; the radar sensor and the stability detection module are respectively connected with input ends of the controller; the tire pressure sensor is in wireless connection with the controller; the ESC is connected with an output end of the controller; the controller is preset with a first deceleration threshold set of multiple grades of deceleration values corresponding to the travelling state of the follower vehicle relative to the present vehicle; the controller is preset with a second deceleration threshold set of multiple grades of deceleration values corresponding to the stability state of the present vehicle itself; the tire pressure sensor sends a tire burst signal to the controller when a tire burst state of the tire of the vehicle is detected, the controller starts to receive a current travelling state signal of the follower vehicle relative to the present vehicle detected by the radar sensor, and performs analysis and comparison with the first deceleration threshold set, thereby determining a first deceleration value of a corresponding grade, meanwhile, the controller receives a state signal of the present vehicle detected by the stability detection module, sets a stability state assessment value of the present vehicle in combination with a current speed of the present vehicle, and performs analysis and comparison with the second deceleration threshold set, thereby determining a second deceleration value of a corresponding grade, the controller compares the first deceleration value with the second deceleration value, and uses the smaller deceleration value as a tire burst graded braking control instruction, and the controller sends the control instruction to the ESC to control the vehicle to brake at the smaller deceleration value.

ESC is the abbreviation of Electronic Stability Control, and is an electronic vehicle stability control system, which can help to avoid danger, and can control a wheel brake or control an engine torque to compensate the stability of the vehicle when the vehicle is extremely unstable during quick turning or lane change. The tire pressure sensor detects the current pressure in the tire in real time, the pressure in the tire generates a huge change in the case of vehicle tire burst, and the tire pressure sensor sends the tire burst signal to the controller when detecting the tire burst state of the tire of the vehicle. At this time, the controller receives the travelling state signal of the follower vehicle relative to the present vehicle detected by the radar sensor after the tire burst of the present vehicle, the controller analyzes the received signal sent by the radar sensor, compares it with the first deceleration threshold set, thereby determining the first deceleration value of a corresponding grade, meanwhile, the stability detection module detects the state signal of the present vehicle itself and sends the state signal to the controller, the controller sets the stability state assessment value of the present vehicle by means of the signal sent by the stability detection module in combination with the current speed, and performs analysis and comparison with the second deceleration threshold set, thereby determining the second deceleration value of a corresponding grade. After obtaining the first deceleration value and the second deceleration value, the controller compares the first deceleration value with the second deceleration value, and uses the smaller deceleration value as the tire burst graded braking control instruction. If the first deceleration value is smaller than the second deceleration value, the first deceleration value is used as the tire burst graded braking control instruction, and otherwise, the second deceleration value is used as the tire burst graded braking control instruction. The controller sends the control instruction to the ESC to control the vehicle to brake at the smaller deceleration value. In this way, quick and stable braking of the tire burst vehicle is guaranteed, and the rear-end collision between the follower vehicle and the tire burst vehicle can be avoided.

In the graded braking control device for vehicle tire burst, the first deceleration threshold set includes distance division intervals divided along a distance between the follower vehicle and the present vehicle if they stop by braking and deceleration values respectively corresponding to the distance intervals of the follower vehicle and the present vehicle if stop by braking. Each of the distance division intervals of the follower vehicle and the present vehicle if braking stop corresponds to a deceleration value, and the controller determines the deceleration value that should be chosen currently to prevent the present vehicle from decelerating at a larger deceleration to result in the rear-end collision of the present vehicle with the follower vehicle.

In the graded braking control device for vehicle tire burst, the second deceleration threshold set includes stability state grades of the present vehicle and deceleration values respectively corresponding to the stability state grades. The controller determines the current grade of the stability state of the present vehicle to choose the corresponding deceleration value, so as to prevent the potential safety hazard resulting from that the present vehicle decelerates at a larger deceleration to cause more instability of the present vehicle.

In the graded braking control device for vehicle tire burst, the controller is further connected with a CAN bus network used for sending the current speed of the present vehicle; when the controller receives the tire burst signal and determines that the current speed value sent by a vehicle speed sensor is higher than a safe vehicle speed value, the controller sends the tire burst graded braking control instruction to the ESC, and the ESC controls the vehicle to execute the tire burst graded braking control instruction; and when the controller receives the tire burst signal and determines that the current speed value sent by the vehicle speed sensor is lower than the safe vehicle speed value, the controller does not send the tire burst graded braking control instruction to the ESC. When the vehicle travels at the safe vehicle speed, as the driver of the follower vehicle has an enough response time to avoid the rear-end collision, and the stability state of the present vehicle will be higher, the vehicle can be controlled by the driver himself.

In the graded braking control device for vehicle tire burst, the controller is further connected with a vehicle body controller (or body control module, BCM) used for controlling execution of a vehicle light state instruction, the controller sends a signal control instruction of turning on hazard warning flashers to the vehicle body controller when receiving the tire burst signal detected by the tire pressure sensor, the vehicle body controller controls turn-on of the hazard warning flashers; when the controller sends the tire burst graded braking control instruction, the controller also sends a control instruction of turning on brake lamps to the vehicle body controller, and the vehicle body controller turns on the brake lamps when the vehicle carries out the tire burst graded braking. After the vehicle tire burst, the controller controls turn-on of the hazard warning flashers to alert the follower vehicle to the failure of the present vehicle, and the controller controlling turn-on of the brake lamps when controlling the vehicle to brake is also for the purpose of alerting the follower vehicle, so that the driver of the follower vehicle can carry out relevant operations to avoid rear-end collision.

In the above-mentioned graded braking control device for vehicle tire burst, the controller is further connected with an information interactive interface, and the interactive interface includes a display screen, an alarm device and a button, which are respectively connected with the controller. When receiving the tire burst state signal, the controller controls the alarm device to emit an alarm to alert the driver to the alarm of the vehicle; and the controller controls the alarm to emit a voice alarm when automatically controlling the vehicle to decelerate, in order to alert the driver that the device is automatically controlling the vehicle to decelerate. The display screen is used for displaying the travelling state of the follower vehicle relative to the present vehicle and the stability state grade of the present vehicle, and the button is used for switching the display contents of the display screen.

A graded braking control method for vehicle tire burst includes the following steps:

A, monitoring vehicle tire condition: when vehicle tire burst is detected by a tire pressure sensor, a controller commands a vehicle body controller to turn on hazard warning flashers and gives an alarm for alert;
the controller controls the vehicle body controller to turn on the hazard warning flashers to alert a follower vehicle to the tire burst of the present vehicle, and meanwhile, the controller controls an alarm device to alarm to alert a driver to the vehicle tire burst;

B, carrying out traffic state assessment and determining a first maximum braking deceleration value for preventing the rear-end collision with the follower vehicle after emergency brake of the present vehicle: the controller is preset with a first deceleration threshold set of multiple grades of deceleration values corresponding to the travelling state of the follower vehicle relative to the present vehicle, the controller receives a current travelling state signal of the follower vehicle relative to the present vehicle detected by a radar sensor, and performs analysis and comparison with the first deceleration threshold set, thereby determining a first deceleration value of a corresponding grade;
the controller obtains the first maximum braking deceleration value for preventing the rear-end collision with the follower vehicle according to the travelling state signal of the follower vehicle relative to the present vehicle; if the vehicle decelerates according to the first deceleration value, the rear-end collision of the present vehicle with the follower vehicle can be avoided, and meanwhile, the first deceleration value is the maximum braking deceleration for preventing the rear-end collision with the follower vehicle, so the present vehicle can be quickly decelerated within a safe range;

C, carrying out tire burst vehicle stability state assessment in combination with the current speed and setting a maximum braking deceleration under stable state: the controller is preset with a second deceleration threshold set of multiple grades of deceleration values corresponding to the stability state of the present vehicle itself; the controller receives a state signal of the present vehicle detected by a stability detection module, sets a stability state assessment value of the present tire burst vehicle in combination with the current speed, and performs analysis and comparison with the second deceleration threshold set, thereby determining a second deceleration value of a corresponding grade;
the controller obtains a second maximum braking deceleration under stable state according to the state signal of the present vehicle in combination with the current speed, and if the vehicle decelerates according to the second deceleration value, so quick brake of the vehicle in the currently most stable state can be guaranteed to avoid an accident resulting from more instability of the vehicle caused by emergency brake of the vehicle; and D, carrying out tire burst graded braking: the controller compares the first deceleration value with the second deceleration value, and uses the smaller deceleration value as a tire burst graded braking control instruction, and the controller sends the control instruction to the ESC when determining that the current speed value is higher than a safe vehicle speed value, and the ESC controls the vehicle to brake at the smaller deceleration value and controls the vehicle body controller to turn on brake lamps.

As the controller uses the smaller one of the first deceleration value and the second deceleration value, both the stable braking of the vehicle and the avoiding of the rear-end collision of the present vehicle with the follower vehicle can be satisfied simultaneously. At the safe vehicle speed, as the driver of the follower vehicle has an enough response time to avoid the rear-end collision, and the stability state of the present vehicle will be higher, the vehicle can be controlled by the driver himself.

In the above-mentioned graded braking control method for vehicle tire burst, in the step B, the first deceleration threshold set includes distance division intervals divided along a distance between the follower vehicle and the present vehicle if they stop by braking and deceleration values respectively corresponding to the distance intervals of the follower vehicle and the present vehicle if stop by braking. Each of the distance division intervals of the follower vehicle and the present vehicle if braking stop corresponds to a deceleration value, and the controller determines the deceleration value that should be chosen currently to prevent the present vehicle from decelerating at another deceleration to result in the rear-end collision of the present vehicle with the follower vehicle.

In the graded braking control method for vehicle tire burst, in the step B, the distance between the present vehicle and the follower vehicle if braking stop=a braking distance of the present tire burst vehicle+a distance between the present vehicle and the follower vehicle−the braking distance of the follower vehicle, the controller puts the distance between the present tire burst vehicle and the follower vehicle if braking stop obtained according to the aforementioned formula into the first deceleration threshold set, and determines the preset division interval range within which the distance between the present tire burst vehicle and the follower vehicle if braking stop is, and the corresponding maximum deceleration within the division interval range is the first deceleration value. The larger the distance between the present vehicle and the follower vehicle after if braking stop is, the smaller the rear-end collision risk of the present vehicle with the follower vehicle is after the present vehicle is braked. Corresponding deceleration values are preset according to different intervals, and the vehicle is decelerated according to the currently corresponding deceleration value, so that the present vehicle can be quickly decelerated within the safe range.

In the above-mentioned graded braking control method for vehicle tire burst, in the step C, the second deceleration threshold set includes stability state grades of the present vehicle and deceleration values corresponding to the stability state grades, the stability state assessment value of the present tire burst vehicle is obtained by a two-dimensional fuzzy controller in the following manner: using an actual value of a vehicle yaw velocity error and an actual value of a change rate of the vehicle yaw velocity error as input variables to obtain the state signal of the present tire burst vehicle, and obtaining the stability state assessment value of the present tire burst vehicle in combination with the current speed, and the stability state assessment value of the present tire burst vehicle corresponds to a preset stability state grade of the present vehicle, so as to obtain the maximum deceleration at the corresponding stability state grade as the second deceleration value. In this way, the calculated stability state assessment value of the present tire burst vehicle is accurate, and thus the obtained second deceleration value conforms to the deceleration necessary for the stability state of the present vehicle.

Compared with the prior art, the graded braking control device for vehicle tire burst has the following advantages:

1. According to the present invention, a maximum braking deceleration for preventing the rear-end collision with the follower vehicle is calculated according to the travelling state of the follower vehicle relative to the present vehicle after tire burst.

2. According to the present invention, a maximum braking deceleration under stable state is obtained according to the stability state signal of the present vehicle in combination with the current speed, to guarantee the quick brake of the vehicle in the currently most stable state.

3. The present invention can ensure quick and stable braking of the tire burst vehicle, and avoid the rear-end collision of the tire burst vehicle with the follower vehicle.

DETAILED DESCRIPTION OF THE EMBODIMENTS

Specific embodiments of the present invention are described below, a further description of technical solutions of the present invention is given in combination with drawings, but the present invention is not limited to these embodiments.

Figure 1:
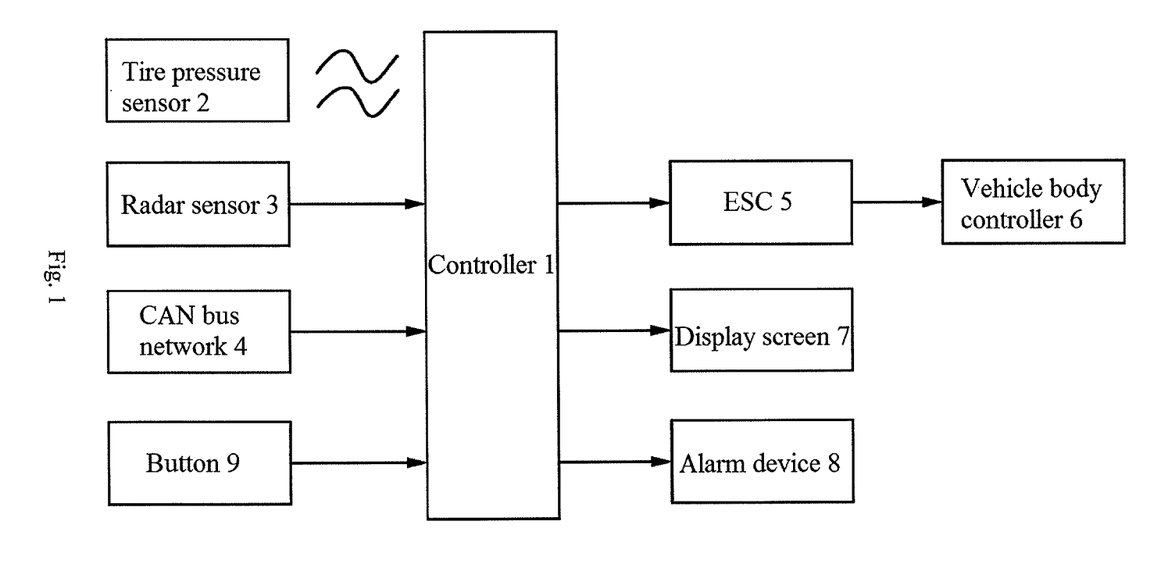
FIG. 1 is a schematic diagram of a structure of the present invention.
Figure 2:
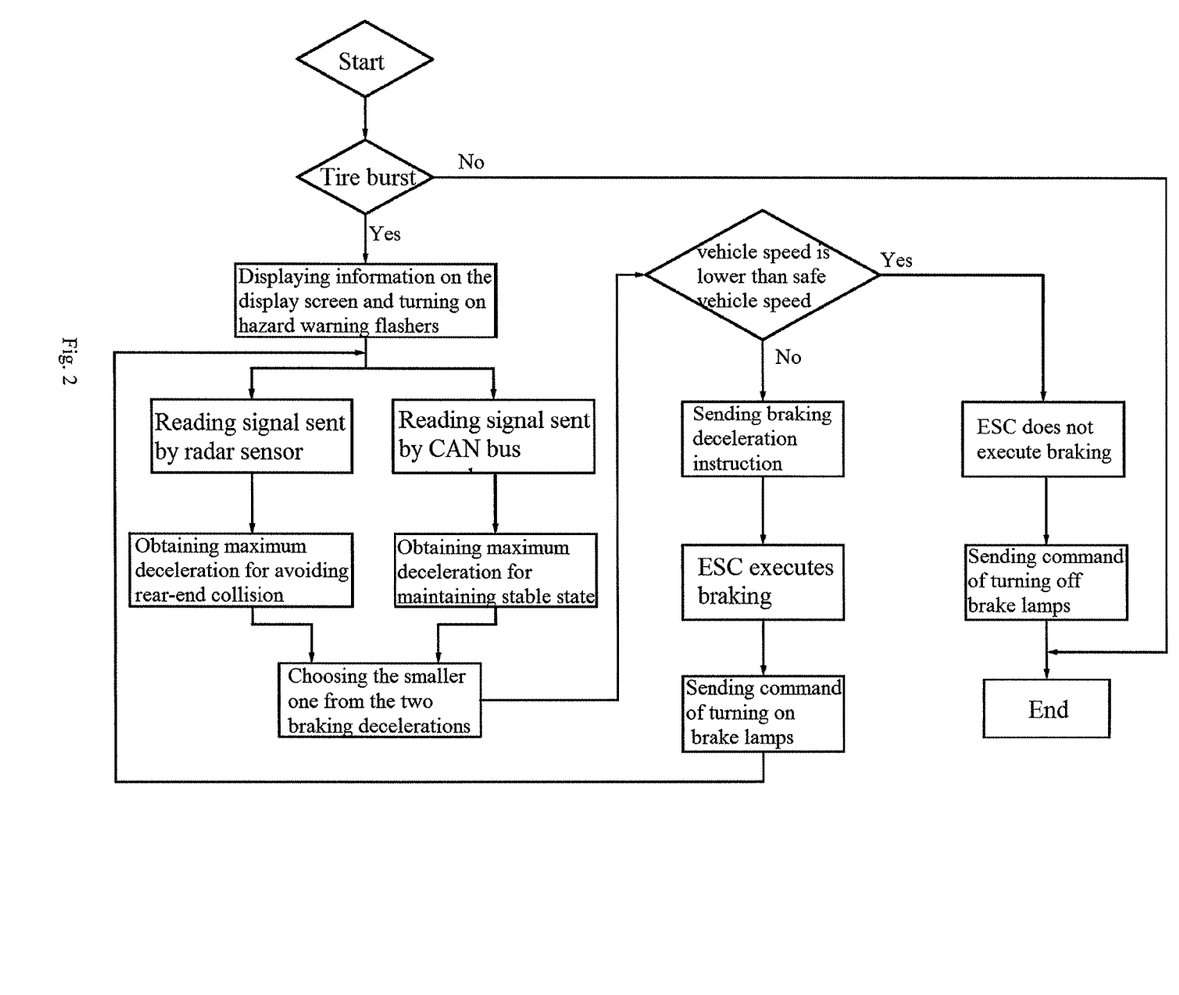
FIG. 2 is a schematic diagram of a main working flow of the present invention.

As shown in FIGS. 1 and 2, the graded braking control device for vehicle tire burst includes a tire pressure sensor 2 used for detecting a tire pressure state of a tire, a controller 1, a radar sensor 3 used for detecting a travelling state of a follower vehicle relative to the present vehicle, a stability detection module used for detecting a stability state of the present vehicle and an ESC 5 used for achieving stable braking of the vehicle. The stability detection module includes a CAN bus network 4, and the CAN bus network 4 is used for sending steering wheel rotation angle information, an actual value of a vehicle yaw velocity and vehicle speed information. The ESC 5, the radar sensor 3 and the stability detection module are respectively connected with input ends of the controller 1, the tire pressure sensor 2 is in wireless connection with the controller 1, and the ESC 5 is connected with an output end of the controller 1. The controller 1 is preset with a first deceleration threshold set of multiple grades of deceleration values corresponding to the travelling state of the follower vehicle relative to the present vehicle, and the controller 1 is preset with a second deceleration threshold set of multiple grades of deceleration values corresponding to the stability state of the present vehicle. The first deceleration threshold set includes distance division intervals divided along a distance between the follower vehicle and the present vehicle after if they stop by braking and deceleration values respectively corresponding to the distance intervals of the follower vehicle and the present vehicle after if braking stop, and the second deceleration threshold set includes stability state grades of the present vehicle and deceleration values respectively corresponding to the stability state grades. The controller 1 is further connected with a vehicle body controller 6 used for controlling execution of a vehicle light state instruction. The controller 1 sends a signal control instruction of turning on hazard warning flashers to the vehicle body controller 6 when receiving a tire burst signal detected by the tire pressure sensor 2, the vehicle body controller 6 controls turn-on of the hazard warning flashers. When the controller 1 sends a tire burst graded braking control instruction, the controller 1 sends a control instruction of turning on brake lamps to the vehicle body controller 6, and the vehicle body controller turns on the brake lamps when the vehicle carries out tire burst graded braking.

The input end of the vehicle body controller 6 is further connected with the ESC 5. The controller 1 sends the signal control instruction of turning on the hazard warning flashers to the vehicle body controller 6 when receiving the tire burst signal detected by the tire pressure sensor 2, the vehicle body controller 6 controls turn-on of the hazard warning flashers in the case of vehicle tire burst. The ESC 5 sends the control instruction of turning on the brake lamps to the vehicle body controller 6 when executing the tire burst graded braking control instruction, and the vehicle body controller 6 turns on the brake lamps when the vehicle carries out tire burst graded braking. The controller 1 is further connected with an information interactive interface, and the interactive interface includes a display screen 7, an alarm device 8 and a button 9, which are respectively connected with the controller 1.

The tire pressure sensor 2 sends the tire burst signal to the controller 1 when a tire burst state of the tire of the vehicle is detected. The controller 1 receives a current travelling state signal of the follower vehicle relative to the present vehicle detected by the radar sensor 3, and performs analysis and comparison with the first deceleration threshold set, thereby determining a first deceleration value of a corresponding grade, and meanwhile, the controller 1 receives a state signal of the present vehicle detected by the stability detection module, sets a stability state assessment value of the present vehicle in combination with a current speed, performs analysis and comparison with the second deceleration threshold set, thereby determining a second deceleration value of a corresponding grade. The controller 1 compares the first deceleration value with the second deceleration value, and uses the smaller deceleration value as the tire burst graded braking control instruction, and the controller 1 sends the control instruction to the ESC 5 to control the vehicle to brake at the smaller deceleration value. The controller 1 is further connected with the CAN bus network 4 for sending the current speed of the present vehicle. The controller 1 sends the tire burst graded braking control instruction to the ESC 5 when receiving the tire burst signal and determining that the current speed value sent by the CAN bus network 4 is higher than a safe vehicle speed value, and the ESC 5 controls the vehicle to execute the tire burst graded braking control instruction; and when the controller 1 receives the tire burst signal and determines that the current speed value sent by the CAN bus network 4 is lower than the safe vehicle speed value, the controller 1 does not send the tire burst graded braking control instruction to the ESC 5.

The tire pressure sensor 2 detects the current pressure in the tire in real time, the pressure in the tire generates a huge change in the case of vehicle tire burst, and the tire pressure sensor 2 sends the tire burst signal to the controller 1 when the tire burst state of the tire of the vehicle is detected. The controller 1 controls the alarm device 8 to alarm to alert the driver to the tire burst of the present vehicle, and meanwhile, the controller 1 sends the control instruction to the vehicle body controller 6 to control the vehicle body controller 6 to turn on the hazard warning flashers. At this time, the controller 1 receives the travelling state signal of the follower vehicle relative to the present vehicle after the radar sensor 3 detects the tire burst of the present vehicle, the travelling state signal includes a vehicle speed of the follower vehicle and a distance between the follower vehicle and the present vehicle, and the controller 1 analyzes the received signal sent by the radar sensor 3, compares with the first deceleration threshold set, thereby determining the first deceleration value of the corresponding grade. The regulation process of the first deceleration threshold set is as follows:

1. Braking Distance of the Follower Vehicle

The driver of the follower vehicle carries out emergency brake after finding abnormality (the hazard warning flashers are turned on, and the brake lamps are turned on) of the present vehicle. In the calculation of the braking distance, it is assumed that the braking response time of the driver is a constant value and the deceleration is a constant value in the braking process, the speed of the follower vehicle is obtained from the radar, and the braking distance of the follower vehicle is calculated by a computational formula according to the above conditions.

2. Braking Distance of the Tire Burst Vehicle

The tire burst state of the present vehicle is automatically identified by the controller 1 of tire burst vehicle graded braking, the response time is 100-500 ms, it is assumed that the average response time is a constant value in the calculation, the braking deceleration in an active braking process of the controller 1 is a constant value. After the tire burst vehicle graded braking quits, the braking deceleration of the driver of the tire burst vehicle is a constant value. The present vehicle obtains the vehicle speed at the time of tire burst from the CAN bus network 4. The braking distance of the present vehicle is calculated by a computational formula according to the above conditions after tire burst.

3. Determination of the Braking Deceleration Based on Rear Traffic Conditions

The controller 1, according to the braking distance of the present vehicle and the braking distance of the follower vehicle as well as the original distance between the two vehicles obtained by the radar sensor 3, can obtain the distance between the vehicles after if they stop by braking according to a computational formula. The larger the distance between the vehicles after braking stop is, the smaller the rear-end collision risk with the follower vehicle after emergency braking is. Different braking deceleration requirements are made according to the size of the distance between the vehicles after if braking stop. The distance between the vehicles after braking stop is divided into three intervals, namely smaller than 20 m, 20-50 m and larger than 50 m, and the braking decelerations corresponding to the three intervals are respectively set to the following three grades of braking decelerations: $-2$ m/s$^2$, $-4$ m/s$^2$ and $-6$ m/s$^2$.

Therefore, the controller 1 analyzes the received vehicle speed of the follower vehicle and the distance signal between the follower vehicle and the present vehicle sent by the radar sensor 3, compares with the first deceleration threshold set, thereby determining the first deceleration value of the corresponding grade.

When the controller 1 performs analysis and comparison to obtain the first deceleration value, the CAN bus network 4 sends the detected stability state signal of the present vehicle to the controller 1, the stability state signal includes the steering wheel rotation angle information, the actual value of the vehicle yaw velocity and the vehicle speed information, and the controller 1 analyzes the signal sent by the CAN bus network 4, compares with the second deceleration threshold set, thereby determining the second deceleration value of the corresponding grade.

The regulation process of the second deceleration threshold set is as follows: the controller 1 obtains a vehicle yaw velocity in an ideal state according to the steering wheel rotation angle information, and the controller 1 subtracts the vehicle yaw velocity in the ideal state from the actual value of the vehicle yaw velocity to obtain an actual value of a vehicle yaw velocity error and obtains a change rate of the vehicle yaw velocity error according to the time change. According to the actual value of the vehicle yaw velocity error and the change rate of the vehicle yaw velocity error, the controller 1 obtains the stability state of the vehicle, and according to the current speed, the controller 1 obtains several deceleration values, which are respectively 5 grades of deceleration values, namely, 0 m/s$^2$, −2 m/s$^2$, −3 m/s$^2$, −4 m/s$^2$ and −5 m/s$^2$.

Therefore, the controller 1 analyzes the signal sent by the CAN bus network 4, and compares with the second deceleration threshold set, thereby determining the second deceleration value of the corresponding grade.

After obtaining the first deceleration value and the second deceleration value, the controller 1 compares the first deceleration value with the second deceleration value, and uses the smaller deceleration value as the tire burst graded braking control instruction. If the first deceleration value is smaller than the second deceleration value, the first deceleration value is used as the tire burst graded braking control instruction, and otherwise, the second deceleration value is used as the tire burst graded braking control instruction. The controller 1 can calculate to obtain the necessary braking deceleration after the tire burst of the present vehicle in real time.

When the current speed value is higher than the safe vehicle speed value, the controller 1 sends the control instruction to the ESC 5 to control the vehicle to brake at the smaller deceleration value. When the ESC 5 executes the tire burst graded braking control instruction, the controller 1 sends the control instruction of turning on the brake lamps to the vehicle body controller 6, the vehicle body controller 6 turns on the brake lamps. Meanwhile, the controller 1 controls the alarm device 8 to give a prompt that the vehicle has been automatically braked. After the ESC 5 performs the breaking to decelerate the vehicle speed to the safe vehicle speed, the controller controls the ESC 5 to quit the braking control, and meanwhile, the controller 1 controls the vehicle body controller 6 to close the brake lamps. When the current speed value is smaller than or equal to the safe vehicle speed value, the controller 1 does not send the tire burst graded braking control instruction to the ESC 5. The safe vehicle speed value is preferably 40 km/h. As the first deceleration value and the second deceleration value are used as the maximum deceleration values respectively in the current traffic state of the vehicle and in the stable state of the vehicle, the smaller deceleration value is chosen to ensure the quick and stable braking of the tire burst vehicle, and the rear-end collision of the tire burst vehicle with the follower vehicle e can be avoided.

After the vehicle tire burst, the controller 1 controls the display screen 7 to display the travelling state of the follower vehicle relative to the present vehicle and the stability state grade of the present vehicle, and the button 9 is used for switching the display contents of the display screen 7, so that the driver can conveniently know the conditions of the present vehicle. The graded braking control device for vehicle tire burst can obtain the necessary deceleration value of the present vehicle in a short time and decelerates the vehicle to ensure the safety of the tire burst vehicle.

The graded braking control method for vehicle tire burst includes the following steps:

A, monitoring vehicle tire condition: when vehicle tire burst is detected by the tire pressure sensor 2, the controller 1 is activated, the controller 1 commands the vehicle body controller 6 to turn on the hazard warning flashers and gives an alarm for alert;

B, carrying out traffic state assessment and determining a first maximum braking deceleration value for preventing the rear-end collision with the follower vehicle after emergency brake of the present vehicle: the controller 1 is preset with a first deceleration threshold set of multiple grades of deceleration values corresponding to the travelling state of the follower vehicle relative to the present vehicle, the controller 1 receives a current travelling state signal of the follower vehicle relative to the present vehicle detected by the radar sensor 3, and performs analysis and comparison with the first deceleration threshold set, thereby determining a first deceleration value of a corresponding grade;

C, carrying out tire burst vehicle stability state assessment in combination with the current speed and setting the maximum braking deceleration under stable state: the controller 1 is preset with a second deceleration threshold set of multiple grades of deceleration values corresponding to the stability state of the present vehicle, the controller 1 receives a state signal of the present vehicle detected by the stability detection module, sets a stability state assessment value of the present tire burst vehicle in combination with the current speed, and performs analysis and comparison with the second deceleration threshold set, thereby determining a second deceleration value of a corresponding grade;

D, carrying out tire burst graded braking: the controller 1 compares the first deceleration value with the second deceleration value, and uses the smaller deceleration value as a tire burst graded braking control instruction, and the controller 1 sends the control instruction to the ESC 5 when determining that the current speed value is higher than a safe vehicle speed value, and the ESC 5 controls the vehicle to brake at the smaller deceleration value and controls the vehicle body controller 6 to turn on brake lamps.

In the step B, the first deceleration threshold set includes distance division intervals divided along the distance between the follower vehicle and the present vehicle after if braking stop and deceleration values respectively corresponding to the distance intervals of the follower vehicle and the present vehicle after if braking stop. In the step B, the distance between the present vehicle and the follower vehicle after if braking stop=a braking distance of the present tire burst vehicle+a distance between the present vehicle and the follower vehicle−the braking distance of the follower vehicle. The controller 1 puts the distance between the present tire burst vehicle and the follower vehicle after braking stop obtained according to the aforementioned formula into the first deceleration threshold set, and determines the preset division interval range within which the distance between the present tire burst vehicle and the follower vehicle after if braking stop is, and the corresponding maximum deceleration within the division interval range is the first deceleration value. In the step C, the second deceleration threshold set includes stability state grades of the present vehicle and deceleration values respectively corresponding to the stability state grades, the stability state assessment value of the present tire burst vehicle is obtained by a two-dimensional fuzzy controller 1 in the following manner: using an actual value of a vehicle yaw velocity error and an actual value of a change rate of the vehicle yaw velocity error as input variables to obtain the state signal of the present tire burst vehicle, and obtaining the stability state assessment value of the present tire burst vehicle in combination with the current speed, and the stability state assessment value of the present tire burst vehicle corresponds to a preset stability state grade of the present vehicle, so as to obtain the maximum deceleration at the corresponding stability state grade as the second deceleration value.

The tire pressure sensor 2 sends the tire burst signal to the controller 1 when the tire burst state of the tire of the vehicle is detected, the controller 1 commands the vehicle body controller 6 to turn on the hazard warning flashers to alert the driver of the follower vehicle to the tire burst of the present vehicle, and meanwhile, the controller 1 controls the alarm device 8 to give an alarm for alert. After the controller 1 receives the tire burst signal, the controller 1 starts to receive the travelling state signal of the follower vehicle relative to the present vehicle detected by the radar sensor 3, performs analysis and comparison with the first deceleration threshold set, thereby determining the first deceleration value of the corresponding grade.

The regulation process of the first deceleration threshold set is as follows:

1. Braking Distance of the Follower Vehicle

The driver of the follower vehicle carries out emergency brake after finding abnormality (the hazard warning flashers are turned on, the brake lamps are turned on and the like) of the present vehicle. In the calculation of the braking distance, it is assumed that the braking response time of the driver is a constant value $t_{human\ response}=2$ s, the deceleration is a constant value $a_{follower\ vehicle}=-0.8$ m/s$^2$ in the braking process, the speed $V_{follower\ vehicle}$ of the follower vehicle is obtained from the radar, and the braking distance of the follower vehicle is: $S_{follower\ vehicle}=V_{follower\ vehicle}\times t_{human\ response}+V_{follower\ vehicle}^2\div(2\times a_{follower\ vehicle})$.

2. Braking Distance of the Tire Burst Vehicle

The tire burst condition of the present vehicle is automatically identified by the controller 1, the response time is 100-500 ms, it is assumed that the average response time $t_{system\ response}=300$ ms, the braking deceleration in an active braking process of the tire burst vehicle graded braking system is: $a_{system\ braking}=-0.4$ m/s$^2$. After the controller 1 quits, the braking deceleration of the driver of the tire burst vehicle is the constant value $a_{present\ vehicle}=-0.6$ m/s$^2$. The present vehicle obtains the vehicle speed $v_{present\ vehicle}$ at the time of tire burst from the CAN bus network 4. The braking distance of the present vehicle is: $S_{present\ vehicle}=v_{present\ vehicle}\times t_{system\ response}+(v_{present\ vehicle}^2-(40\ km/h)^2)\div(2\times a_{system\ braking})+(40\ km/h)^2\div(2\times a_{present\ vehicle})$, wherein 40 km/h is the safe vehicle speed, and the controller 1 quits from the control at the safe vehicle speed.

3. Determination of the Braking Deceleration Based on Rear Traffic Conditions

The distance S between the present vehicle and the follower vehicle is obtained from the radar sensor 3, the distance L between the two vehicles after braking stop is: $L=S_{present\ vehicle}+S-S_{follower\ vehicle}$, the larger the L is, the smaller the rear-end collision risk with the follower vehicle after emergency braking is. Different braking deceleration requirements are set according to the size of the L, the L is divided into three intervals, namely smaller than 20 m, 20-50 m and larger than 50 m, and the braking decelerations corresponding to the three intervals are respectively set to the following three grades of braking decelerations: $-2$ m/s$^2$, $-4$ m/s$^2$ and $-6$ m/s$^2$.

When obtaining the first deceleration value, the controller 1 carry out tire burst vehicle stability state assessment in combination with the current speed and sets the maximum braking deceleration under stable state. The controller 1 receives state signal of the present vehicle of the CAN bus network 4, sets the stability state assessment value of the present tire burst vehicle in combination with the current speed, and performs analysis and comparison with the second deceleration threshold set, thereby determining the second deceleration value of the corresponding grade.

The regulation process of the second deceleration threshold set is as follows. The controller 1 includes a two-dimensional fuzzy controller 1, the controller 1 obtains a vehicle yaw velocity in an ideal state according to the steering wheel rotation angle information, and the controller 1 subtracts the vehicle yaw velocity in the ideal state from the actual value of the vehicle yaw velocity to obtain an actual value of a vehicle yaw velocity error and obtains a change rate of the vehicle yaw velocity error according to the time change. The two-dimensional fuzzy controller 1 is adopted, the actual value E of the vehicle yaw velocity error and the actual value EC of the change rate of the vehicle yaw velocity error are used as input variables, EC represents deterioration or improvement trend of the vehicle yaw velocity error, and the stability state assessment S2 of the tire burst vehicle is used as an output variable. The input variables and the output variable are fuzzified, fuzzy subsets of the normalized input variables E, EC and the output variable S2 are uniformly divided into 7 fuzzy grades, which respectively represent "negative large", "negative medium", "negative small", "zero", "positive small", "positive medium" and "positive large". The 7 fuzzy grades are the state grades of the vehicle, the two-dimensional fuzzy controller 1 is used for determining the graded braking deceleration of the tire burst vehicle, the state fuzzy grade S2 of the vehicle and the actual value V of the vehicle speed are used as the input variables, and the braking deceleration A is used as the output variable. The input variables and the output variable are fuzzified, fuzzy subsets of the variable S2 are uniformly divided into 7 fuzzy grades, and the fuzzy subsets of the normalized vehicle speed V are divided into 6 fuzzy grades, which respectively represent "ultra low speed", "low speed", "medium speed", "medium high speed", "high speed" and "ultra high speed". The fuzzy subsets of the normalized output variable A are divided into 5 fuzzy grades, which respectively correspond to 5 grades of deceleration values, namely, 0 m/s$^2$, $-2$ m/s$^2$, $-3$ m/s$^2$, $-4$ m/s$^2$ and $-5$ m/s$^2$.

After obtaining the first deceleration value and the second deceleration value, the controller 1 compares the first deceleration value with the second deceleration value, and uses the smaller deceleration value as the tire burst graded braking control instruction. For example, the first deceleration value is $-4$ m/s$^2$ and the second deceleration value is $-2$ m/s$^2$, then the controller 1 chooses $-2$ m/s$^2$ as the tire burst graded braking control instruction. When the current speed is higher than the set safe vehicle speed value 40 km/h, the controller 1 sends the control instruction to the ESC 5, the ESC 5 controls the vehicle to brake at the deceleration of −2 m/s², and the controller 1 controls the vehicle body controller 6 to turn on the hazard warning flashers, and meanwhile, the controller 1 controls the alarm device 8 to give a prompt indicating that the vehicle has been automatically braked. The controller 1 calculates the necessary braking deceleration of the present vehicle after tire burst in real time and sends the braking deceleration to the ESC 5 for execution. When the vehicle speed is decelerated to be lower than 40 km/h, the controller 1 control the ESC 5 to quit from the braking control. When determining the current speed is lower than the set safe vehicle speed value 40 km/h, the controller 1 does not execute the tire burst graded braking control instruction.

After the vehicle tire burst, the display screen 7 displays the travelling state of the follower vehicle relative to the present vehicle and the stability state grade of the present vehicle, and the button 9 is used for switching the display contents of the display screen 7, so that the driver can conveniently know the conditions of the present vehicle.

The specific embodiments described herein are merely exemplary illustration to the spirit of the present invention. Those skilled in the art to which the present invention belongs can make various modifications or supplements or substitutions in similar ways to the specific embodiments described herein, without departing from the spirit of the present invention or going beyond the scope defined by the appended claims.

Although the controller 1, the tire pressure sensor 2, the radar sensor 3, the CAN bus network 4, the ESC 5, the vehicle body controller 6, the display screen 7, the alarm device 8, the button 9 and other terms are frequently used in this paper, the possibility of using other terms is not excluded. These terms are merely used for describing and explaining the essence of the present invention more conveniently; and interpreting them as any additional limitations deviates from the spirit of the present invention.

The invention claimed is:

1. A graded braking control device for vehicle tire burst, comprising a tire pressure sensor for detecting a tire pressure state of a tire, wherein the device further comprises a controller, a radar sensor for detecting a travelling state of a follower vehicle relative to the present vehicle, a stability detection module for detecting a stability state of the present vehicle and an ESC for achieving a stable braking of the vehicle; the radar sensor and the stability detection module are individually connected to input ends of the controller; the tire pressure sensor is in wireless connection with the controller; the ESC is connected with an output end of the controller; the controller is preset with a first deceleration threshold set of multiple grades of deceleration values corresponding to the travelling state of the follower vehicle relative to the present vehicle; the controller is preset with a second deceleration threshold set of multiple grades of deceleration values corresponding to the stability state of the present vehicle itself; the tire pressure sensor sends a tire burst signal to the controller when a tire burst state of the tire of the vehicle is detected, then the controller starts to receive a current travelling state signal of the follower vehicle relative to the present vehicle detected by the radar sensor, and performs analysis and comparison with the first deceleration threshold set, thereby determining a first deceleration value of a corresponding grade, meanwhile, the controller receives a state signal of the present vehicle detected by the stability detection module, sets a stability state assessment value of the present vehicle in combination with a current speed of the present vehicle, and performs analysis and comparison with the second deceleration threshold set, thereby determining a second deceleration value of a corresponding grade, the controller compares the first deceleration value with the second deceleration value, and uses the smaller deceleration value as a tire burst graded braking control instruction, and the controller sends the control instruction to the ESC to control the vehicle to brake at the smaller deceleration value.

2. The graded braking control device for vehicle tire burst of claim 1, wherein the first deceleration threshold set comprises distance division intervals divided along a distance between the follower vehicle and the present vehicle if they stop by braking and deceleration values respectively corresponding to the distance intervals of the follower vehicle and the present vehicle if stop by braking.

3. The graded braking control device for vehicle tire burst of claim 2, wherein the controller is further connected with a CAN bus network used for sending the current speed of the present vehicle; when the controller receives the tire burst signal and determines that the current speed value sent by a vehicle speed sensor is higher than a safe vehicle speed value, the controller sends the tire burst graded braking control instruction to the ESC, and the ESC controls the vehicle to execute the tire burst graded braking control instruction; and when the controller receives the tire burst signal and determines that the current speed value sent by the vehicle speed sensor is lower than the safe vehicle speed value, and the controller does not send the tire burst graded braking control instruction to the ESC.

4. The graded braking control device for vehicle tire burst of claim 1, wherein the second deceleration threshold set comprises stability state grades of the present vehicle and deceleration values respectively corresponding to the stability state grades.

5. The graded braking control device for vehicle tire burst of claim 3, wherein the controller is further connected with an information interactive interface, and the interactive interface comprises a display screen, an alarm device and a button, which are respectively connected with the controller.

6. The graded braking control device for vehicle tire burst of claim 3, wherein the controller is further connected with a vehicle body controller used for controlling execution of a vehicle light state instruction; the controller sends a signal control instruction of turning on hazard warning flashers to the vehicle body controller when receiving the tire burst signal detected by the tire pressure sensor, the vehicle body controller controls turn-on of the hazard warning flashers; when the controller sends the tire burst graded braking control instruction, the controller also sends a control instruction of turning on brake lamps to the vehicle body controller, and the vehicle body controller turns on the brake lamps when the vehicle carries out the tire burst graded braking.

7. A graded braking control method for vehicle tire burst, comprising the following steps:

A, monitoring vehicle tire condition: when vehicle tire burst is detected by a tire pressure sensor, a controller commands a vehicle body controller to turn on hazard warning flashers and gives an alarm for alert;

B, carrying out traffic state assessment and determining a first maximum braking deceleration value for preventing rear-end collision with a follower vehicle after emergency brake of the present vehicle: the controller is preset with a first deceleration threshold set of multiple grades of deceleration values corresponding to the travelling state of the follower vehicle relative to the present vehicle, the controller receives a current travelling state signal of the follower vehicle relative to the present vehicle detected by a radar sensor, and performs analysis and comparison with the first deceleration threshold set, thereby determining a first deceleration value of a corresponding grade;

C, carrying out tire burst vehicle stability state assessment in combination with the current speed and setting a maximum braking deceleration under stable state: the controller is preset with a second deceleration threshold set of multiple grades of deceleration values corresponding to the stability state of the present vehicle itself, the controller receives a state signal of the present vehicle detected by a stability detection module, sets a stability state assessment value of the present tire burst vehicle in combination with the current speed, and performs analysis and comparison with the second deceleration threshold set, thereby determining a second deceleration value of a corresponding grade;

D, carrying out tire burst graded braking: the controller compares the first deceleration value with the second deceleration value, and uses the smaller deceleration value as a tire burst graded braking control instruction, and the controller sends the control instruction to the ESC when determining that the current speed value is higher than a safe vehicle speed value, and the ESC controls the vehicle to brake at the smaller deceleration value and controls the vehicle body controller to turn on brake lamps.

8. The graded braking control method for vehicle tire burst of claim 7, wherein in the step B, the first deceleration threshold set comprises distance division intervals divided along a distance between the follower vehicle and the present vehicle if they stop by braking and deceleration values respectively corresponding to the distance intervals of the follower vehicle and the present vehicle if stop by braking.

9. The graded braking control method for vehicle tire burst of claim 8, wherein in the step B, the distance between the present vehicle and the follower vehicle if braking stop=a braking distance of the present tire burst vehicle+a distance between the present vehicle and the follower vehicle−the braking distance of the follower vehicle, the controller puts the distance between the present tire burst vehicle and the follower vehicle if braking stop obtained according to the aforementioned formula into the first deceleration threshold set, and determines the preset division interval range within which the distance between the present tire burst vehicle and the follower vehicle if braking stop is, and the corresponding maximum deceleration within the division interval range is the first deceleration value.

10. The graded braking control method for vehicle tire burst of claim 7, wherein in the step C, the second deceleration threshold set comprises stability state grades of the present vehicle and deceleration values respectively corresponding to the stability state grades, the stability state assessment value of the present tire burst vehicle is obtained by a two-dimensional fuzzy controller in the following manner: using an actual value of a vehicle yaw velocity error and an actual value of a change rate of the vehicle yaw velocity error as input variables to obtain the state signal of the present tire burst vehicle, and obtaining the stability state assessment value of the present tire burst vehicle in combination with the current speed; and the stability state assessment value of the present tire burst vehicle corresponds to a preset stability state grade of the present vehicle, so as to obtain the maximum deceleration at the corresponding stability state grade as the second deceleration value.

* * * * *